United States Patent
Ajanahalli et al.

(10) Patent No.: US 11,537,611 B2
(45) Date of Patent: Dec. 27, 2022

(54) GENERATING FILTERED DATA SETS FOR EFFICIENT QUERY EXECUTION

(71) Applicant: Oracle International Corporation, Redwood Shores, CA (US)

(72) Inventors: Pradeep Krishnappa Ajanahalli, Pleasanton, CA (US); Sanjay Anant Pusegaonkar, Palo Alto, CA (US); Atanu Majumdar, San Jose, CA (US); Kartik Raghavan, Pleasanton, CA (US)

(73) Assignee: Oracle International Corporation, Redwood Shores, CA (US)

( * ) Notice: Subject to any disclaimer, the term of this patent is extended or adjusted under 35 U.S.C. 154(b) by 22 days.

(21) Appl. No.: 17/130,099

(22) Filed: Dec. 22, 2020

(65) Prior Publication Data

US 2022/0197906 A1 Jun. 23, 2022

(51) Int. Cl.
| | |
|---|---|
| G06F 16/24 | (2019.01) |
| G06F 16/2453 | (2019.01) |
| G06F 16/901 | (2019.01) |
| G06F 16/22 | (2019.01) |

(52) U.S. Cl.
CPC .... *G06F 16/24542* (2019.01); *G06F 16/2246* (2019.01); *G06F 16/24537* (2019.01); *G06F 16/9024* (2019.01)

(58) Field of Classification Search
CPC .......... G06F 16/2455; G06F 16/24537; G06F 16/24542; G06F 16/2246; G06F 16/9027; G06F 16/9026; G06F 16/9024
See application file for complete search history.

(56) References Cited

U.S. PATENT DOCUMENTS

| | | | |
|---|---|---|---|
| 2012/0226681 A1* | 9/2012 | Paparizos | G06F 16/24578 707/723 |
| 2019/0095494 A1* | 3/2019 | Bhattacharjee | G06F 11/3086 |
| 2021/0027315 A1* | 1/2021 | Nanavati | G06K 9/6218 |

* cited by examiner

*Primary Examiner* — Cindy Nguyen
(74) *Attorney, Agent, or Firm* — Invoke

(57) ABSTRACT

A system filters a data set for the efficient execution of queries by removing at least some irrelevant records to generate a reduced data set. The records are determined to be irrelevant based on the values of the records for the particular attribute(s) corresponding to the filtering operation. The system filters out records within a data set that do not include any of the values defined for the particular attribute by a set of queries that are to be executed on the filtered set of records.

25 Claims, 13 Drawing Sheets

302

| RuleNo | Attributes |
|---|---|
| 1 | Country=US and Aux1=High Technology and Indst=Retail, Chemicals |
| 2 | Indst=Life Sciences, Education & Research and Country=US |
| 3 | ActType=Named and Country=US and Indst=Retail, Chemicals and Aux2=Partnership |
| 4 | Indst is not Null and Aux2 is not null and Country=Italy, France, Norway |
| 5 | YearEstablished=2018 and Country=US and Indst=Oil & Gas and Aux2=Limited Liability Company |
| 6 | Country=Uganda, Ukraine , Tokelau and Indst=Aerospace & Defense and Aux3=All Languages |
| 7 | Country=Switzerland |

| Ranking | |
|---|---|
| Country | 7 |
| Indust | 6 |
| Aux2 | 3 |
| Aux1 | 1 |
| Aux3 | 1 |
| AcctTyp | 1 |
| YearEst | 1 |

| Re-ordering Attributes in Rules Based on Ranking | | | |
|---|---|---|---|
| Rule No. | Attributes | | |
| 1 Country | Indst | Aux1 | |
| 2 Country | Indst | | |
| 3 Country | Indst | Aux2 | ActType |
| 4 Country | Indst | Aux2 | |
| 5 Country | Indst | Aux2 | Year Est |
| 6 Country | Indst | Aux3 | |
| 7 Country | | | |

| Data Set (5 Records) | | | | | | |
|---|---|---|---|---|---|---|
| Record ID | Country | Ind | Aux 3 | Aux 2 | Aux 1 | Acct Type |
| 1 | US | Ret | (Null) | Partnership | High Tech | Named |
| 2 | US | Life Sci | (Null) | (Null) | (Null) | (Null) |
| 3 | Ita | Ret | (Null) | (Null) | (Null) | (Null) |
| 4 | Ind | (Null) | (Null) | (Null) | (Null) | (Null) |
| 5 | Uga | Aero & Def | All Lang | (Null) | (Null) | (Null) |

Figure 3E

GENERATING FILTERED DATA SETS FOR EFFICIENT QUERY EXECUTION

TECHNICAL FIELD

The present disclosure relates to filtering a data set for the efficient execution of a set of queries by removing at least some records that are not relevant to the set of queries. Multiple successive filtering operations generate different subsets of records for execution of different queries.

BACKGROUND

Databases store vast amounts of data that need to be analyzed and sorted to be acted upon by systems. Extracting information from a database is typically performed with Java-based applications. The Java-based applications run on devices outside the database layer. Java-based applications define a particular set of rules to apply to a set of data. However, the process of extracting the data from the database, performing the processing of the data to apply the rules to the data, and storing the results is a time-consuming process. In addition, extracting the data from the database and providing it to the Java-based application introduces a level of insecurity as the data is transferred between environments.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIGS. 3A-3I illustrate an example embodiment in accordance with one or more embodiments.

DETAILED DESCRIPTION

Figure 1:
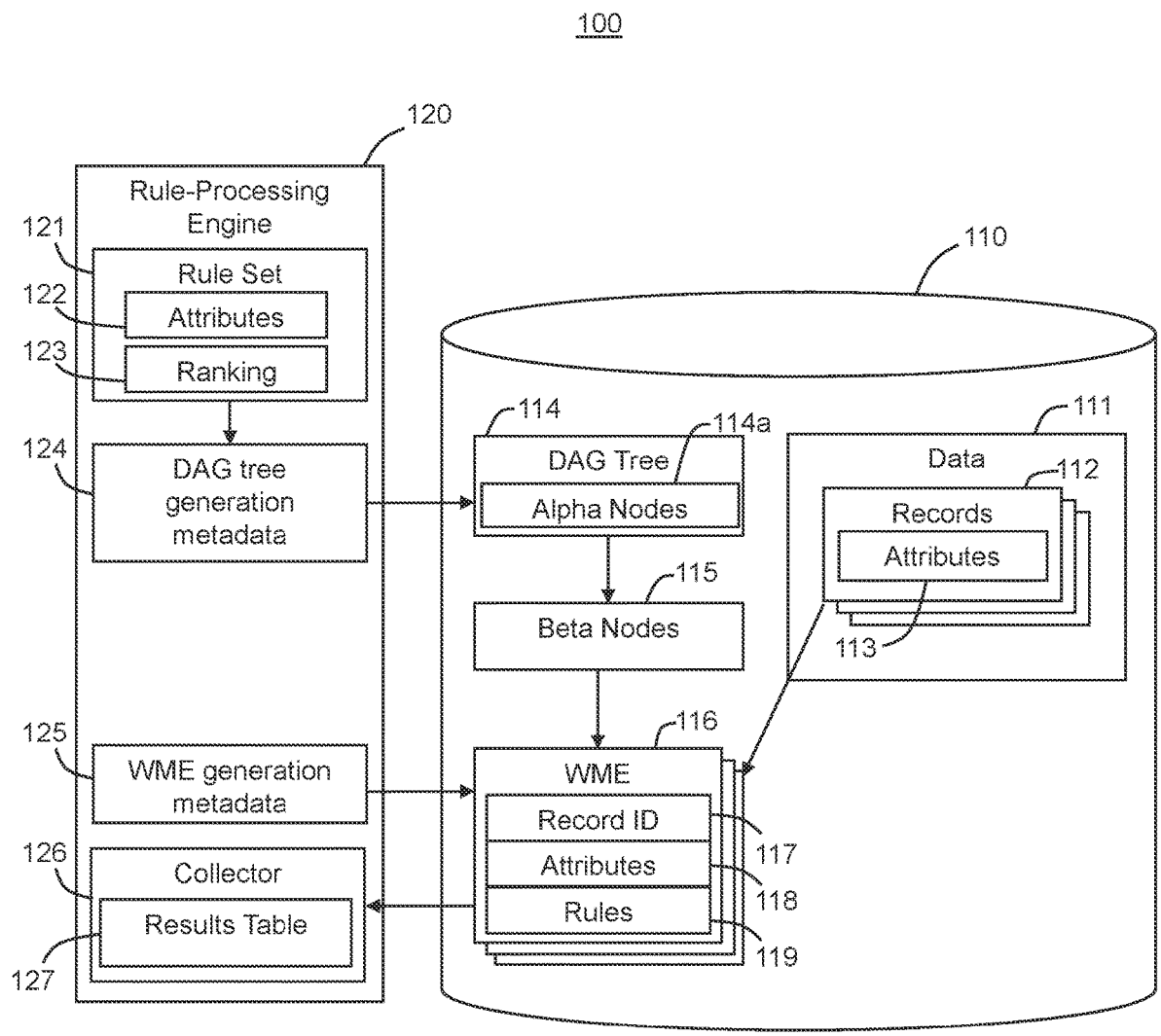
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. RULE PROCESSING ARCHITECTURE
3. GENERATING FILTERED DATA SETS FOR EFFICIENT QUERY EXECUTION
4. EXAMPLE EMBODIMENT
5. COMPUTER NETWORKS AND CLOUD NETWORKS
6. MISCELLANEOUS; EXTENSIONS
7. HARDWARE OVERVIEW

1. General Overview

A rule, as referred to herein, defines at least one value for at least one attribute of a record. A query may be equivalent to a rule or may define constraints in addition to the constraints defined by the rule. The time and computational resources necessary to execute a query (or set of queries) may be proportional to a size of the data set on which the query is to be executed. Accordingly, it is advantageous to reduce the data set on which a query is to be executed by removing one or more records that are identified as irrelevant to the query. In an example, a set of two queries, to be executed on a data set, respectively define two values for a particular attribute of a record. Records within the data set that do not include either of two values for the particular attribute are irrelevant to the execution of the set of queries. Executing the set of queries on a subset of records in the data set which include at least one of the two values for the particular attribute is more efficient than executing the set of queries on all the records in the data set.

One or more embodiments filter a data set for the efficient execution of queries by removing at least some irrelevant records. The records are determined to be irrelevant based on the values of the records for the particular attribute(s) corresponding to the filtering operation. Continuing the above example, the system executes a filtering operation based on a particular attribute. The system filters out records within a data set that do not include either of the two values defined for the particular attribute by the set of queries that are to be executed on the filtered/extracted set of records.

Each extracted subset of the data set is referred to herein as a Working Memory Element (WME). A WME is generated by filtering out a set of records that are determined to be irrelevant to each of a set of one or more rules (queries) associated with that WME. Accordingly, each WME identifies records with attribute values that match the attribute values, for a particular attribute, defined by at least one rule in the set of one or more rules associated with the WME. A WME may identify a record (for example, by including an "identifier" value of a record) without necessarily including all values of that record. In addition to filtering out records, the filtering operation may filter out one or more values of a record (removing columns in a row).

As noted above, a filtering operation filters records based on the values of a particular attribute(s) associated with the filtering operation. One or more embodiments generate an order for the filtering operations based on a ranking of the attributes of a record. The attributes are ranked based on a frequency of usage in an initial set of rules. The larger the number of rules that define value(s) for the attribute, the higher the ranking of the attribute. The filtering operations corresponding to higher ranked attributes are executed on WMEs prior to the filtering operations corresponding to lower ranked attributes.

The system may execute one or more filtering operations on a WME to respectively generate one or more additional WMEs. A filtering operation applied to a first WME, corresponding to a first set of rules, generates a second WME corresponding to a second set of rules that is a subset of the first set of rules. If the filtering operation that generates the second WME corresponds to an attribute, for which a particular rule does not define values, the particular rule is removed from the set of rules associated with the second WME. In this case, the particular rule, that was included in the first set of rules associated with the first WME, is not included in the second set of rules associated with the second WME.

One or more embodiments apply a rule (or query that includes the rule) to a WME associated with the rule. When a rule is associated with multiple WMEs, the rule is applied to a "terminal WME" or the WME (of the multiple WMEs associated with the rule) that identifies the least number of records. The WME, of the WMEs associated with the rule, with the least number of records was generated by filtering out the highest number of records that are irrelevant for that particular rule.

One or more embodiments perform the identification and filtering/extraction operations for the generation of WMEs from a data set without removing the data set from a database that stores the data set. The system executes the identification and extraction operations on tables stored in the database to generate new tables corresponding respectively to the WMEs. One or more embodiments use a Directed Acyclic Graph (DAG) tree for executing one or more operations described above. Each WME and associated set of rules is associated with a node in the DAG tree. Each filtering operation results in the generation of a new node in the DAG tree that is associated with a resulting WME and associated set of rules that is a subset of the rules associated with the parent tree.

One or more embodiments described in this Specification and/or recited in the claims may not be included in this General Overview section.

2. Rule Processing Architecture

FIG. 1 illustrates a system 100 in accordance with one or more embodiments. As illustrated in FIG. 1, system 100 includes a data repository 110 and a rule-processing engine 120. In one or more embodiments, the system 100 is a database. The rule-processing engine 120 obtains a set of rules 121. The rules may be obtained, for example, by a user accessing particular data in the data repository 110. Each of the rules is made up of one or more attributes 122 including an attribute value. The rule-processing engine 120 applies the rule set 121 to the data 111 in the data repository 110 to retrieve subsets of data. Each rule in the set of rules 121 returns a separate subset of data.

The rule-processing engine 120 generates a ranking 123 of the attributes 122. In one embodiment, the ranking 123 is generated based on a number of rules in which an attribute is found. An attribute that is found in more rules in the rule set 121 is assigned a higher ranking than an attribute found in fewer rules in the rule set 121.

The rule-processing engine 120 generates and stores metadata 124 for generating a directed acyclic graph (DAG) tree, including one or more alpha nodes 114a, based on the ranking 123 of the rules in the rule set 121. In one embodiment, the metadata 124 for generating the DAG tree includes a re-ordering of the attributes within each rule of the set of rules 121 according to the ranking 123. In one or more embodiments, the DAG tree generation metadata 124 further includes metadata for generating one or more beta nodes 115. Beta nodes 115 are logical combinations of two alpha nodes.

In one or more embodiments, a separate DAG tree 114 is generated for each object stored in the data repository 110. An object may be a table, or a set of tables, relating to one class of data, such as an "accounts" object that includes fields related to each account tracked by the system. Other example, objects include "contacts," "resources," "regions," "buildings," "opportunities," "leads," etc. Beta nodes 115 are created by logically combining the alpha nodes of one DAG tree with alpha nodes of another DAG tree. For example, a rule may include attributes from two different objects. If an alpha node of one DAG tree resolves one rule for Rule 1, and if an alpha node of another DAG tree resolves another attribute of Rule 1, then a beta node created by joining the two alpha nodes may be a table of records for which the logical combination of the two alpha nodes holds true. In addition, the beta node may be the terminal node for Rule 1.

The rule-processing engine 120 generates the DAG tree 114 in the data repository 110. The DAG tree 114 is a data structure that defines relationships between the attributes of rules in the rule set 121. The rule-processing engine 120 applies each node of the DAG tree, in descending order of rank, to the data 111 to populate working memory elements (WMEs) 116 for each node of the DAG tree 114 with a subset of the data 111 that pertain to the respective WME 116. The WMEs 116 may be generated based on WME generation metadata 125 provided by the rule-processing engine 120. The WMEs 116 are tables that store a record identifier 117 for each record 112 of the data 111 applicable to the particular node of the DAG tree 114. The WMEs 116 also include attribute fields 118 to store values of the attributes 113 of the records 112 of data 111 that are run through the DAG tree 114 to generate the WMEs 116. For each record in a respective WME 116, the attribute fields 118 are provided only for the attributes that are un-resolved in the DAG tree 114. Each node of the DAG tree 114 (and therefore each corresponding WME 116) resolves a separate attribute. The WMEs 116 also include rules fields 119 storing data regarding the rules to which a particular record in the WME 116 applies. Each rule in the rule set 121 specifies attribute values for a set of attributes. When each attribute for a particular rule is resolved in the DAG tree 114, the corresponding node at which the last attribute in the rule is resolved is referred to as a terminal node for that rule.

In one or more embodiments, the rule-processing engine 120 generates WME generation metadata 125. The WME generation metadata 125 defines the structure of each WME. The rule-processing engine 120 structures each WME 116 as a table that identifies attributes 113 of records 112 that correspond to attributes 122 of the rule set 121. The rule-processing engine 120 evaluates rules in the rule set 121 to determine whether each attribute 122 of a rule has been resolved in the DAG tree 114. Each WME 116 identifies rules from the rule set 121 that have attributes that were not resolved in prior alpha nodes in the DAG tree 114.

In one or more embodiments, once the rule-processing engine 120 has applied each node of the DAG tree 114 to the data 111 and the WMEs 116 have been populated with records 112 for each node of the DAG tree 114, a collector 126 determines the records 112 that correspond to each respective rule of the rule set 121. The collector 126 identifies a particular rule to apply to the data and the associated terminal node in the DAG tree 114 for the particular rule. Once record data for each rule have been collected, the DAG tree 114, beta nodes 115, and WMEs 116 may be erased or deleted. A new set of rules 121 including different attributes 122 may result in the generation of a new DAG tree 114, new beta nodes 115, and new WMEs 116. In one or more embodiments, the collector 126 compiles the collected results and stores them in a results table 127.

In one or more embodiments, the repository 110 and the rule-processing engine 120 are both part of a database 100. In one or more embodiments, generating the DAG tree 114, beta nodes 115, and WMEs 116 is performed without reading out the data 111 from the database 100. Instead, the rule-processing engine 120 generates the DAG tree 114 in the data repository 112. In addition, the WMEs 116 are generated in the data repository 110. The collector 126 accesses a WME 116 that is a terminal node for a particular rule to identify records including attributes that correspond to the attributes of the rule.

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 5, titled "Computer Networks and Cloud Networks."

In one or more embodiments, a data repository 110 is any type of storage unit and/or device (e.g., a file system, collection of tables, or any other storage mechanism) for storing data. Further, a data repository 110 may include multiple different storage units and/or devices. The multiple different storage units and/or devices may or may not be of the same type or located at the same physical site. Further, a data repository 110 may be implemented or may execute on the same computing system as the rule-processing engine 120. Alternatively, or additionally, a data repository 110 may be implemented or executed on a computing system separate from the rule-processing engine 120. A data repository 110 may be communicatively coupled to the rule-processing engine 120 via a direct connection or via a network.

In one or more embodiments, the system 100 refers to hardware and/or software configured to perform operations described herein for a rule-processing engine that generates data tables that match attributes and evaluate rules. Examples of operations for the rule-processing engine are described below with reference to FIGS. 2A and 2B.

In an embodiment, the system 100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In one or more embodiments, the system 100 includes an interface. The interface refers to hardware and/or software configured to facilitate communications between a user and the rule-processing engine 120. An interface renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of an interface are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, an interface is specified in one or more other languages, such as Java, C, or C++.

3. Generating Filtered Data Sets for Efficient Query Execution

Figure 2A:
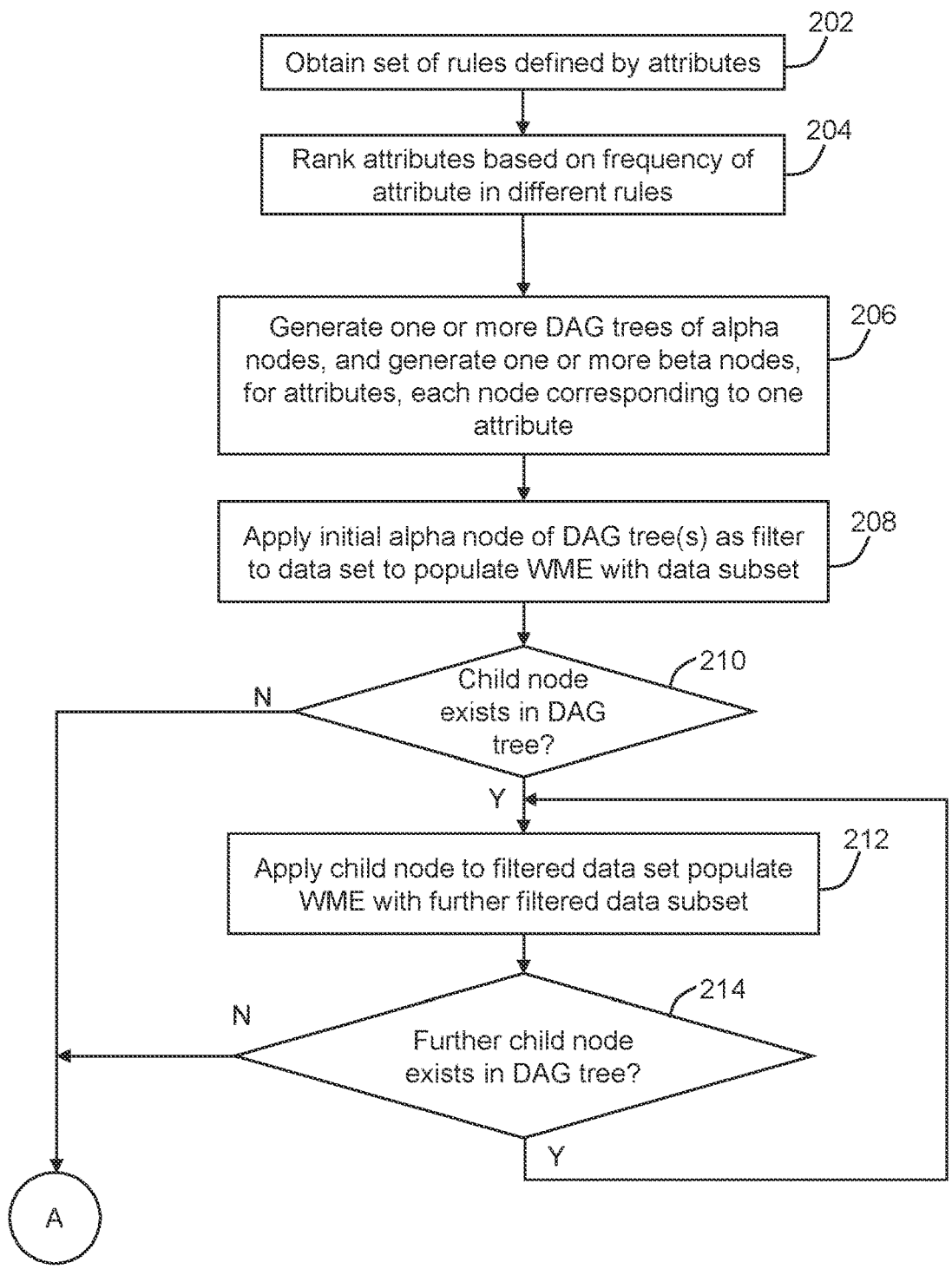
FIGS. 2A and 2B illustrate an example set of operations for generating filtered data sets for query executing using a rule-processing engine in accordance with one or more embodiments.
Figure 2B:
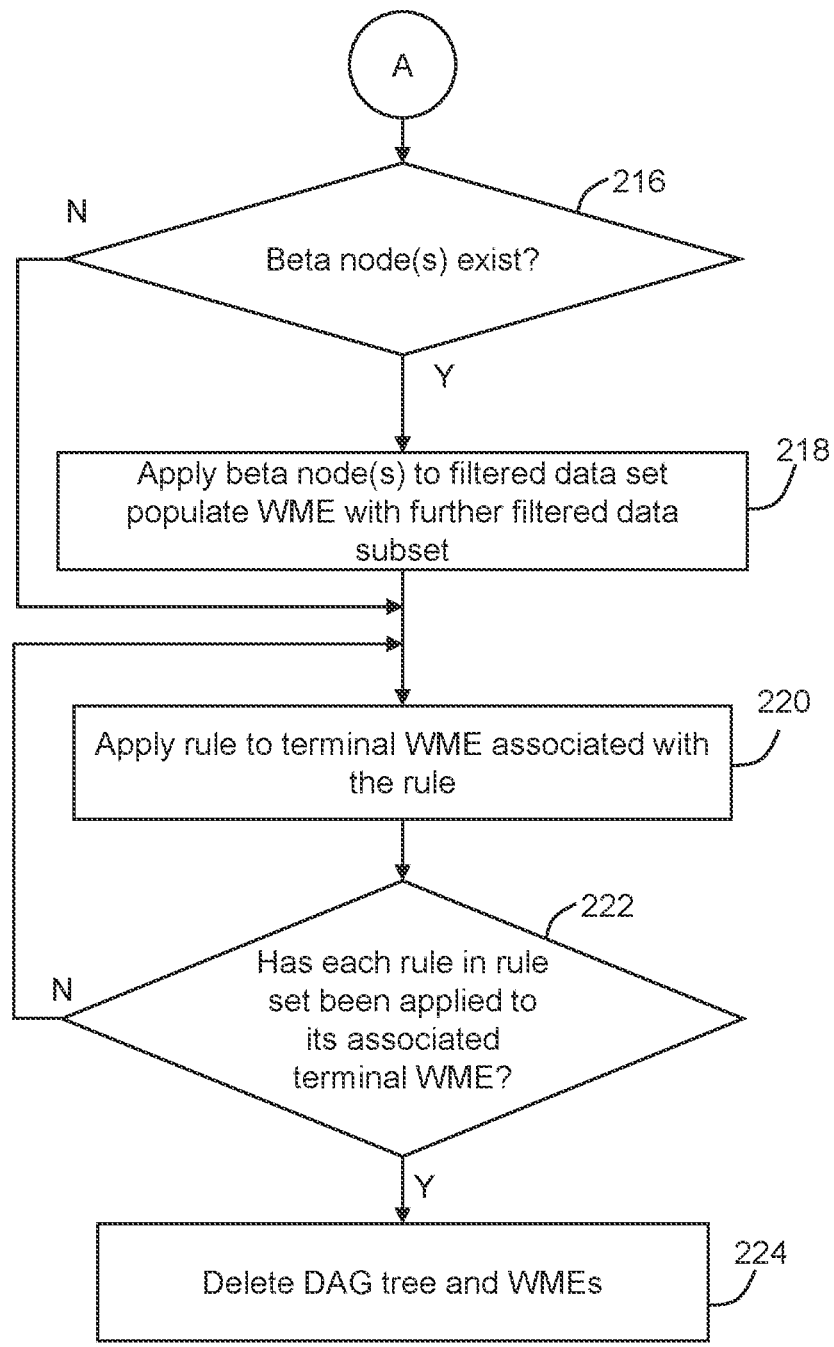

FIGS. 2A and 2B illustrate an example set of operations for generating filtered data sets for efficient query execution in accordance with one or more embodiments. One or more operations illustrated in FIGS. 2A and 2B may be modified, rearranged, or omitted all together. Accordingly, the particular sequence of operations illustrated in FIGS. 2A and 2B should not be construed as limiting the scope of one or more embodiments.

A rule-processing engine obtains a set of rules (Operation 202). Each rule is defined by attributes, and each attribute has a value. For example, one rule may include the following: Attrib 1: value X; Attrib 2: value Y. Another rule may include the following: Attrib 1: value Z; Attrib 3: value B. Yet another rule may include the following: Attrib 1: value X; Attrib 4: value C. The different attribute values define the sets of data that correspond to the respective rules. For the first rule, only data including a value of X for attribute 1 and a value of Y for attribute 2 would satisfy the first rule. For the second rule, only data including a value of Z for attribute 1 and a value of B for attribute 3 would satisfy the second rule.

The rule-processing engine ranks the attributes based on a frequency of the attribute in the different rules (Operation 204). For example, if the rule-processing engine obtains a set of 100 rules, 50 of the rules require some value for attribute 1, 25 of the rules require some value for attribute 2, and 25 of the rules include a value for attribute 3. Attribute 1 is assigned a higher rank than attribute 2. In instances in which two attributes have the same occurrence in the set of rules (for example, "country" attribute and "state" attribute both occur 50 times in the set of rules), these attributes may be ranked based on a determination that one attribute will result in discarding more records, after performing filtering, than the other.

The rule-processing engine generates one or more DAG trees, made up of alpha nodes, for the attributes found in the set of rules (Operation 206). In one or more embodiments, each node of the DAG tree corresponds to only one attribute. The node filters records from a set of data based on the presence in the records of an attribute value associated with the attribute that the node resolves. In one or more embodiments, the rule-processing engine re-orders the attributes within the respective rules based on the ranking of the attributes to determine the structure of the DAG tree(s). The rule-processing engine then generates the DAG tree(s) based on the re-ordered conditions of the rules.

In one or more embodiments, generating the DAG tree includes generating one or more beta nodes. Each node of a DAG tree is referred to as an alpha node. Generating a beta node is performed by logically combining two alpha nodes. For example, a first DAG tree may be generated to correspond to a first object in a data set. A second DAG tree may be generated to correspond to a second object. Each node of each DAG tree resolves an attribute of a rule. Two nodes of the separate DAG trees that resolve attributes of the same rule are combined to create a beta node that resolves the attributes of both alpha nodes.

Since the structure of the DAG tree is defined by ranking the particular attributes in the rule set, a different DAG tree may be generated for each rule set received by a rule-processing engine. The DAG tree is particularly designed to match the attribute value information in a set of data with defined attribute value information in a received set of rules. In addition, one set of rules may result in generating multiple different DAG trees.

The highest-ranked node of the DAG tree is applied to a set of data to generate a subset of the data that is filtered to include only records including an attribute value for the attribute associated with the highest-ranked node (Operation 208). A working memory element (WME) is generated as a result. The WME includes each record, from the set of data, including an attribute value associated with the attribute resolved by the node. The WME is a table identifying (1) records, (2) attributes that have not yet been resolved in the DAG tree, and (3) rules including attributes that have not yet been previously resolved in the DAG tree.

The data set includes multiple records. Each record includes attribute values for one or more attributes. In one or more embodiments, the data set may include hundreds, thousands, tens of thousands, hundreds of thousands, or millions of records. In one or more embodiments, the DAG tree is generated and stored in a data repository. In one embodiment, the DAG tree is stored in the same data repository in which the data set is stored.

Each alpha node of the DAG tree, and each beta node, corresponds to one WME. A rule-processing engine uses one WME to resolve one attribute found in the set of rules. If a particular WME resolves an attribute that is the last attribute to be resolved in a particular rule, the corresponding alpha node in the DAG tree is the "terminal node" for the particular rule. The rule-processing engine does not analyze any subset of data of an WME that is downstream from a terminal node for a particular rule to determine whether the subset of data includes attribute values for attributes defined in the particular rule. Accordingly, fewer rules are evaluated by a rule-processing engine applying filters of nodes farther down the DAG tree relative to nodes higher up the DAG tree.

In addition, for any WME in which a particular record does not have an attribute value matching an attribute value required by at least one of the rules in the WME, the particular record is dropped from the set of data being filtered using the DAG tree. Accordingly, for a DAG tree associated with a single object, fewer records are identified in WMEs farther down the DAG tree relative to WMEs higher up the DAG tree.

The rule-processing engine determines that a child alpha node exists in the DAG tree (Operation 210). The child alpha node is a node having a ranking lower than the initial alpha node of the DAG tree.

The child node is applied to the data subset of the WME associated with the initial alpha node (Operation 212). The child node is associated with another attribute included in the set of rules. Applying the child node of the DAG tree to the data subset populates another WME with records that include values for the attribute associated with the child node. Accordingly, for a DAG tree associated with a single object, fewer records are identified in WMEs for child nodes relative to WMEs of parent nodes.

In one or more embodiments, a rule may include attribute values from attributes in two or more different objects. In such an embodiment, one alpha node of one DAG tree may resolve the last attributed for the rule in one object, and a child alpha node may be generated to resolve an attribute of another object. In this embodiment, since the child node filters additional records from the other object, the resulting WME of the child node may include more records than the parent node.

The process of identifying child nodes in the DAG tree to be applied to subsets of data from parent WMEs (Operation 214) is repeated until each node of the DAG tree is applied to a subset of data to generate a respective WME. In one or more embodiments, the set of data filtered by the alpha nodes of the DAG tree are stored in the same data repository as the DAG tree and the WMEs. The data is filtered by the DAG tree without being moved from the database.

The rule processing engine determines whether any beta nodes exist (Operation 216). The beta nodes combine alpha nodes from different DAG trees. In particular, the WMEs of the beta nodes include a set of records having attribute values for attributes from different objects for the same rule.

If beta nodes exist, the rule processing engine applies the beta node(s) to the filtered data sets of the WMEs of the respective DAG trees to generate a WME for the beta node(s) (Operation 218). For example, if a rule includes an attribute value for one attribute of one object and another attribute value for another attribute of another object, the one attribute may be resolved in one alpha node of one DAG tree, the other attribute may be resolved in another alpha node of another DAG tree, and the one alpha node and the other alpha node may be combined to generate a beta node for the rule.

Once each node of the DAG tree has been applied to the data set, the rule-processing engine accesses the data corresponding to each respective rule. The rule-processing engine applies a rule, from the set of rules defining the DAG tree, to the terminal WME associated with the rule (Operation 220). As discussed above, the terminal WME for a rule is the WME corresponding to the terminal node of the DAG tree in which the last attribute included in the rule is resolved. For example, a rule may include attribute values for three different attributes. A first attribute may be resolved at the highest-ranked node of the DAG tree. A second attribute may be resolved at a first child node in the DAG tree. A third attribute may be resolved at a second child node of the DAG tree, that is a child of the first child node. In one or more embodiments, the number of records in an WME associated with the highest-ranked node is greater than the number of records in an WME associated with the first child node. Likewise, the number of records in the WME associated with the first child node is greater than the number of records in an WME associated with the second child node. The rule-processing engine accesses the WME associated with the second child node to identify the subset of records that includes values for the three different attributes included in the rule. In one or more embodiments, the rule-processing engine does not access the WMEs associated with the highest-ranked node or the first child node to identify the records pertaining to the rule. The rule-processing engine may transmit the results to a querying device or user.

The rule-processing engine determines whether each WME associated with a respective terminal node of each respective rule, in the rule set defining the DAG tree, has been accessed to obtain the subset of records associated with the each respective WME. (Operation 222). For example, if a set of ten different rules is used to define the structure of the DAG tree, the rule-processing engine determines whether all ten rules have accessed the ten WMEs associated with the respective ten terminal nodes of the DAG tree.

Once each rule has been applied to a corresponding terminal node, the DAG tree and WMEs are deleted (Operation 224). The data set that was evaluated using the DAG tree remains intact and unchanged. The WMEs that provided filtered subsets of data are deleted. Obtaining a new set of rules initiates generating a new DAG tree to resolve a new set of attributes.

4. Example Embodiment of a Rule-Processing Engine

A detailed example is described below for purposes of clarity. Components and/or operations described below should be understood as one specific example which may not be applicable to certain embodiments. Accordingly, components and/or operations described below should not be construed as limiting the scope of any of the claims.

FIGS. 3A-3I illustrate an example embodiment of filtering data sets for efficient query execution according to one or more embodiments.

FIG. 3A illustrates a set of rules 302. The rules include attributes: "country," "industry," "auxiliary 1," "auxiliary 2," "auxiliary 3," "Year Established," and "Act Type." The rules define values for the respective attributes that satisfy the respective rule. For example, a record satisfies Rule 1 if it includes a "country" value of "US"; an "Aux 1" value of "High Technology"; and an "Industry" value of either "Retail" or "Chemicals." A record will satisfy Rule 7 if it includes a "country" value of "Switzerland." In one or more embodiments, a set of rules is provided to a rules-processing engine by a user, an administrator, or a pre-defined location in memory.

FIG. 3B illustrates a ranking 304 of the attributes in the rules of FIG. 3A. The "country" attribute appears in seven rules; the "industry" attribute appears in six rules; etc. The attributes are ranked according to the number of rules in which the attributes appear. In other words, an attribute that helps define more rules is assigned a higher ranking than an attribute that defines fewer rules.

FIG. 3C illustrates a re-ordering of the attributes 306 within the rules based on the ranking. For example, while Rule 2 may be provided to a rule-processing engine as "Industry"=[value], then "country"=[value], after re-ordering, the rule is expressed as "country"=[value] and then "industry"=[value]. The rules expressed with the re-ordered attributes, based on ranking, serve to define a DAG tree.

Figure 3D:
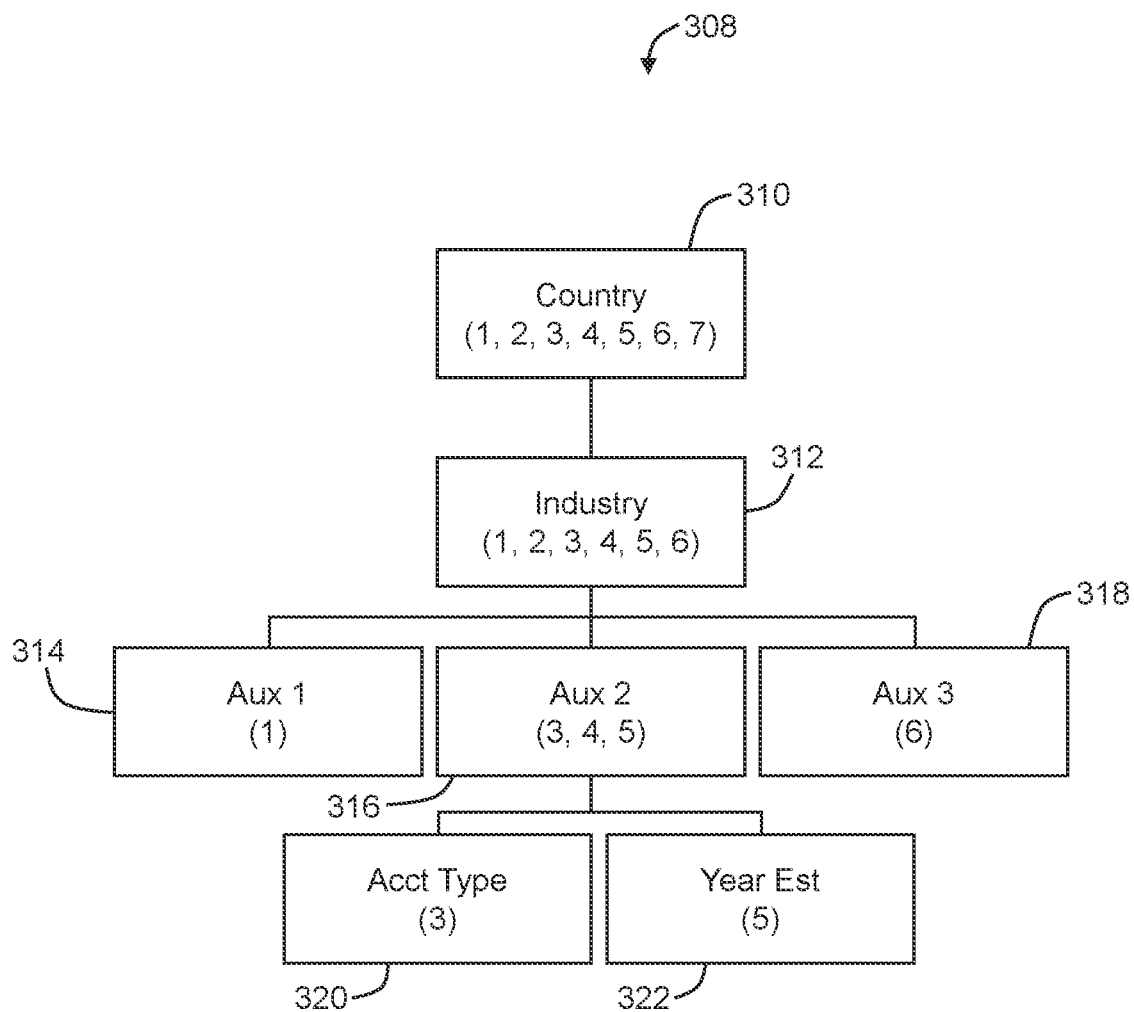

FIG. 3D illustrates a DAG tree 308 generated based on the rules expressed with the re-ordered attributes. The DAG tree 308 includes one single node for each attribute found among the rules in the rule set. The highest-ranking attributes are resolved in nodes that are higher up the DAG tree relative to the lower-ranked attributes. The "country" node 310 is the upper-most node, since it was the attribute including the highest rank. Rules 1-7 are evaluated in the "country" node 310. Node 310 is the terminal node for Rule 7, since resolving the "country" attribute resolves every defined attribute in Rule 7.

The "industry" node 312 follows the "country" node 310. Rules 1-6 are evaluated in the "industry" node. Node 312 is the terminal node for Rule 2, since resolving the "country" attribute and the "industry" attribute resolves every defined attribute in Rule 2. FIG. 3D illustrates a DAG tree 308 in which each node is a terminal node for only one rule. In one or more embodiments, multiple rules may define values for the same set of attributes. When multiple rules define identical sets of attributes, the multiple rules share a terminal node. For example, if a Rule 8 defined values for only the "country" attribute and the "industry" attribute, node 312 would be the terminal node for both Rule 2 and Rule 8.

The "Aux 1" node 314, the "Aux 2" node 316, and the "Aux 3" node 318 branch off from the "industry" node 312. In other words, since none of the rules in the rule set included both a defined value for Aux 1 and a defined value for Aux 3, these attributes are resolved in nodes that do not have a parent/child relationship in the DAG tree 308. Rule 1 is evaluated in the "Aux 1" node 314; Rule 2 is evaluated in the "Aux 3" node 318; and Rules 3, 4, and 5 are evaluated in the "Aux 2" node 316.

Node 314 is the terminal node for Rule 1, since resolving the attributes "country," "industry," and "Aux 1" resolves every attribute in Rule 1. Node 316 is the terminal node for Rule 4, since resolving the attributes "country," "industry," and "Aux 2" resolves every attribute in Rule 4. Node 318 is the terminal node for Rule 6, since resolving the attributes "country," "industry," and "Aux 3" resolves every attribute in Rule 6.

FIG. 3E illustrates a data set 324 according to one example embodiment. The data set 324 includes five records, numbered 1-5. Each record includes an attribute value for at least one attribute: "country," "industry," "Aux 3," "Aux 2," "Aux 1," and "Acct Type."

Figure 3F:
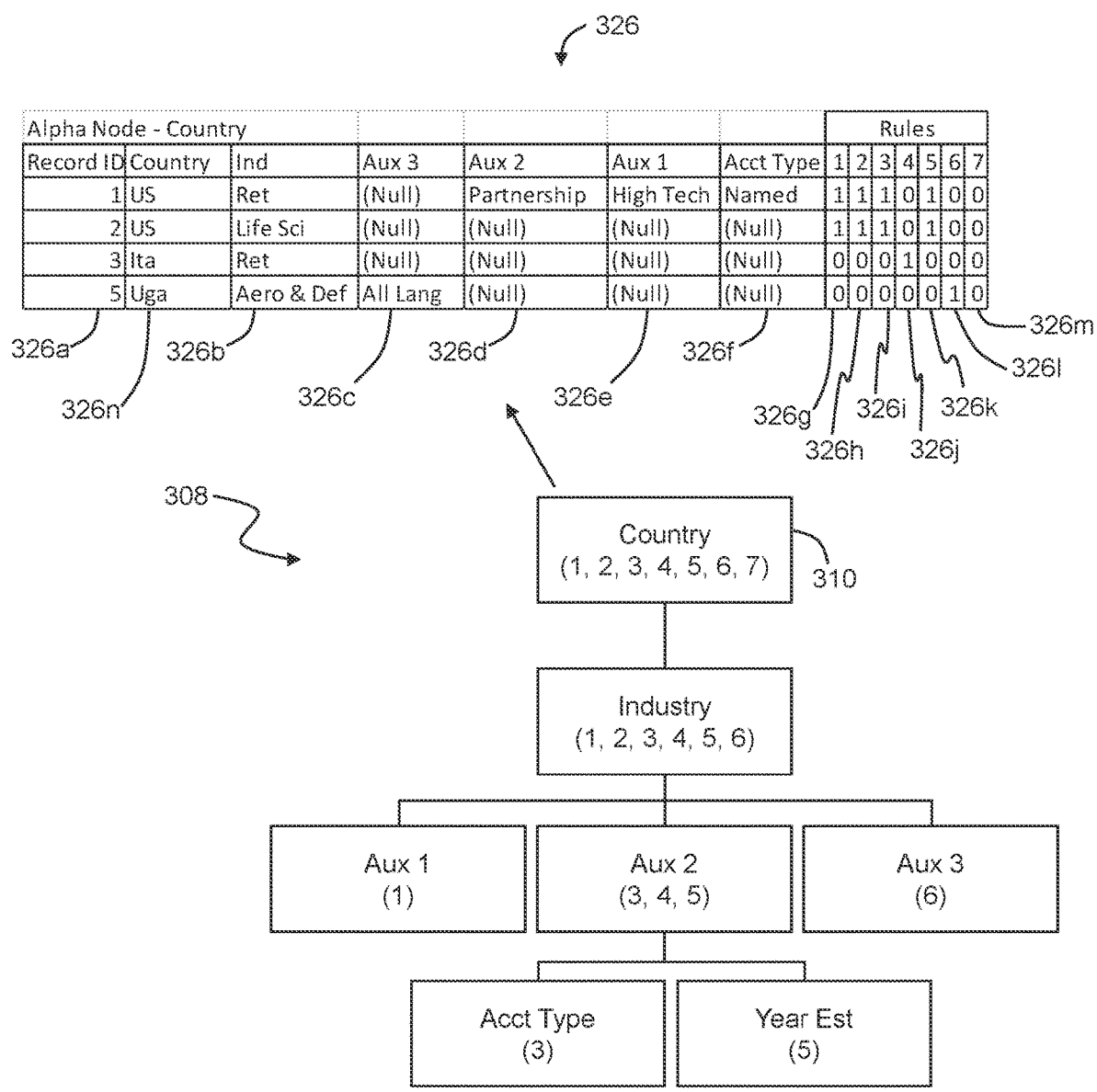

FIG. 3F illustrates generating a working memory element (WME) 326 for the node 310. The WME 326 includes a field for the record identifier 326a, a separate field for each unresolved attribute 326b-326f, and a separate field for each rule 326g-326m. Although a "country" field 326n is provided in FIG. 3F for purposes of illustration, in one or more embodiments, a field is omitted for the attribute being resolved by the WME 326. In other words, in one or more embodiments, the "country" field 326n is omitted form WME 326.

A rule-processing engine analyzes all five records in the data set 324 to determine whether any record includes a value corresponding to the attribute "country." Since record number 4 has a "country" value ("Ind") that does not match an attribute value in any rule, record number 4 is omitted from the WME 326. Accordingly, at each stage of the DAG tree 308, records are dropped from the data subsets defining the WMEs if the records do not have an attribute value matching the attribute being resolved in a particular WME.

Figure 3G:
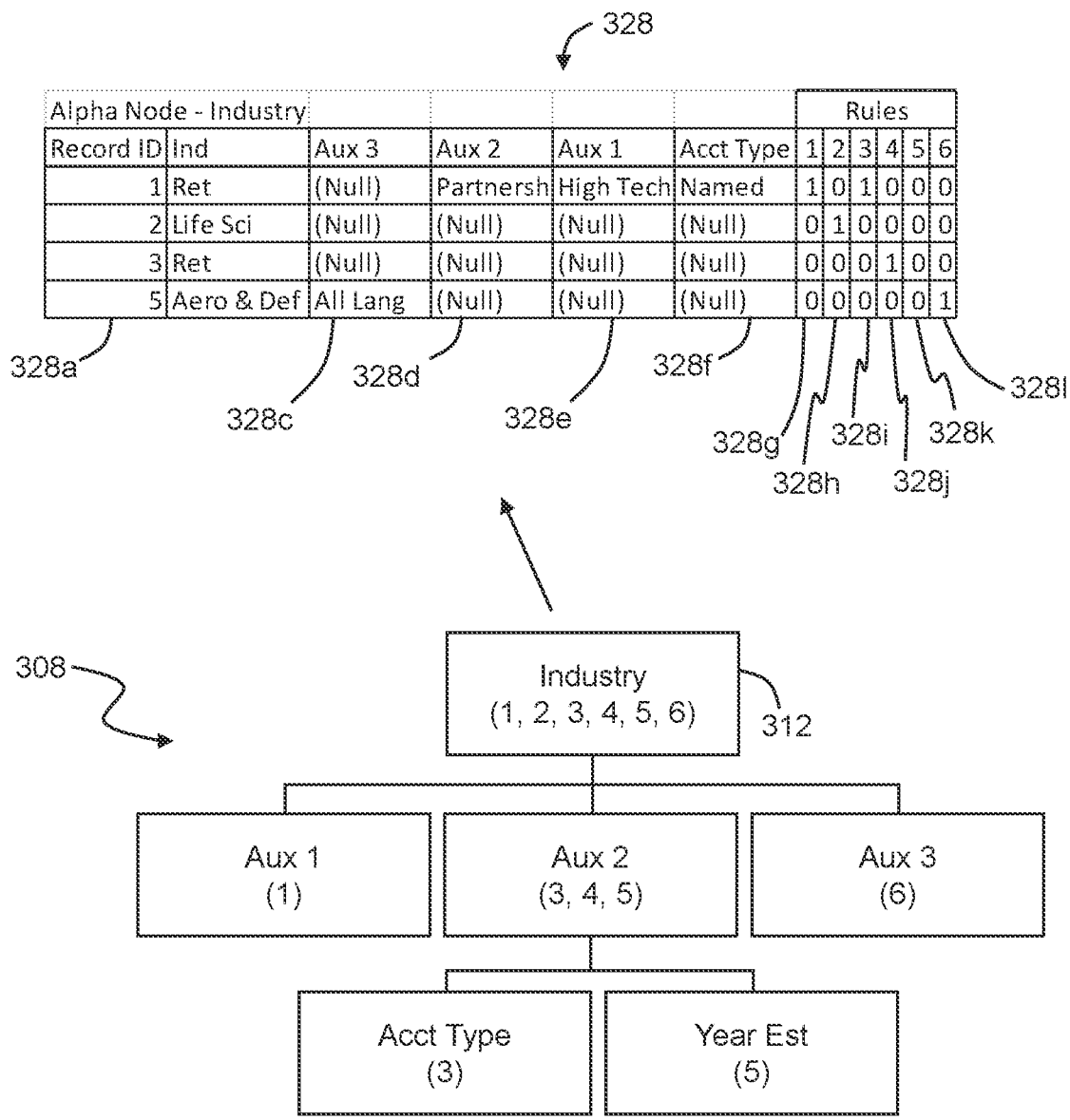

FIG. 3G illustrates the WME 328 for the "Industry" node 312. Rule 7 is omitted from the WME 328, and each WME downstream from WME 328, since every attribute in Rule 7 was previously resolved by the WME 326. A rule-processing engine analyzes the subset of records in WME 326 to determine whether any record includes a value corresponding to the attribute "industry." The rule-processing engine does not need to analyze each record in the data set 324. Accordingly, the WME 328 includes fields for the record numbers of the records still under consideration 328a. The WME 328 includes fields 328c-328f for attributes that have not yet been resolved by the DAG tree 308. The WME 328 also includes fields 328g-328l for rules being evaluated.

The values for the fields 328g-328l reflect whether any of the records in the subset of records still under evaluation are capable of satisfying the respective rule. Thus, the values in the fields 328g-328l do not change from "0" to "1" when a child node of the DAG tree is applied to the subset of data of a parent node.

For example, record number 3 has an value of "retail" for the "industry" attribute. Rules 1 and 3 require a value of "retail" for the "industry" attribute. However, since the attribute value in record number 3 corresponding to the previously-resolved attribute "country" did not match the attribute value for "country" defined by rules 1 and 3, the value corresponding to rules 1 and 3 remains "0" or "null"

in the fields 328g and 328i. In other words, once a record has been evaluated with respect to a rule in the DAG tree, the record is not re-evaluated in connection with another attribute defined in the same rule. The record has already been determined to not apply to the rule, and a rule-processing engine does not need to make the same determination when processing nodes farther down the DAG tree. If the rule-processing engine determines in an upstream node of the DAG tree that a record cannot satisfy a given rule, the determination is maintained in each downstream node, regardless of the attribute being evaluated in the downstream node.

Figure 3H:
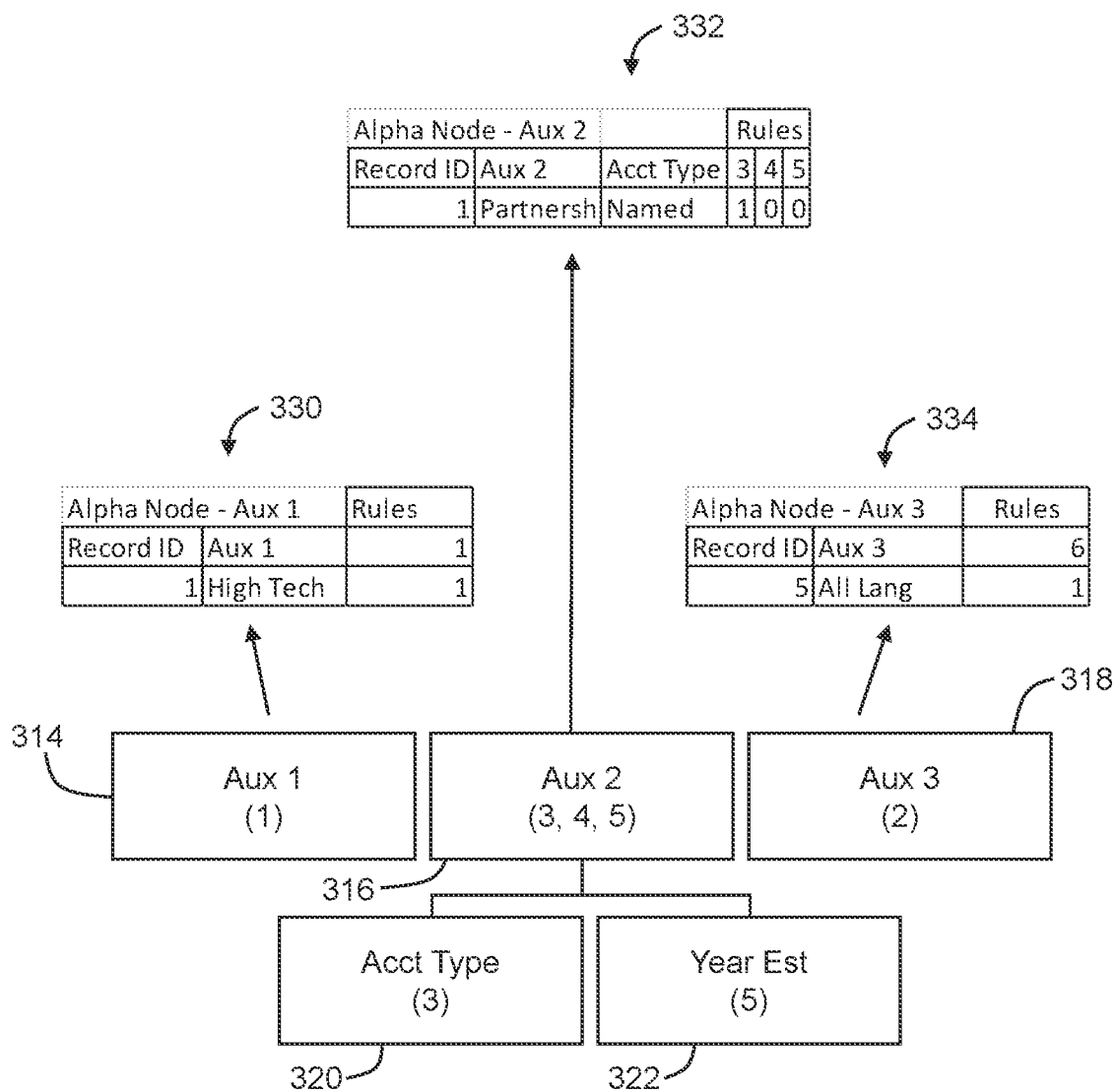

FIG. 3H illustrates the WMEs 330, 332, and 334 for the nodes 314, 316, and 318, respectively. A rule-processing engine analyzes the subset of records in WME 328 of FIG. 3G and the subset of rules still under evaluation after evaluating WME 328. The rule-processing engine does not need to analyze each record in the data set 324. The engine determines whether any of the remaining records under evaluation in WME 328 includes an attribute value for the attribute "Aux 1" that corresponds to a defined value in any of the remaining rules under evaluation. Since the "industry" node 312 was the terminal node for Rule 2, Rule 2 is no longer under consideration by the rule-processing engine. Based on the analysis, WME 330 is generated. WME 330 includes only a field corresponding to record number 1, since no other record in the subset of records (among records 1, 2, 3, and 5) in WME 328 includes a value for the attribute "Aux 1" that matches a value defined in any rule under evaluation (among rules 1, 3, 4, 5, 6).

Likewise, WME 332 includes only a field corresponding to record number 1, since no other record still under evaluation includes a value for the attribute "Aux 2" that corresponds to a value in any rule still under evaluation. WME 334 includes only a record ID for record number 5, since no other record still under evaluation includes a value for the attribute "Aux 3" that corresponds to a value defined by any rule still under evaluation.

Figure 3I:
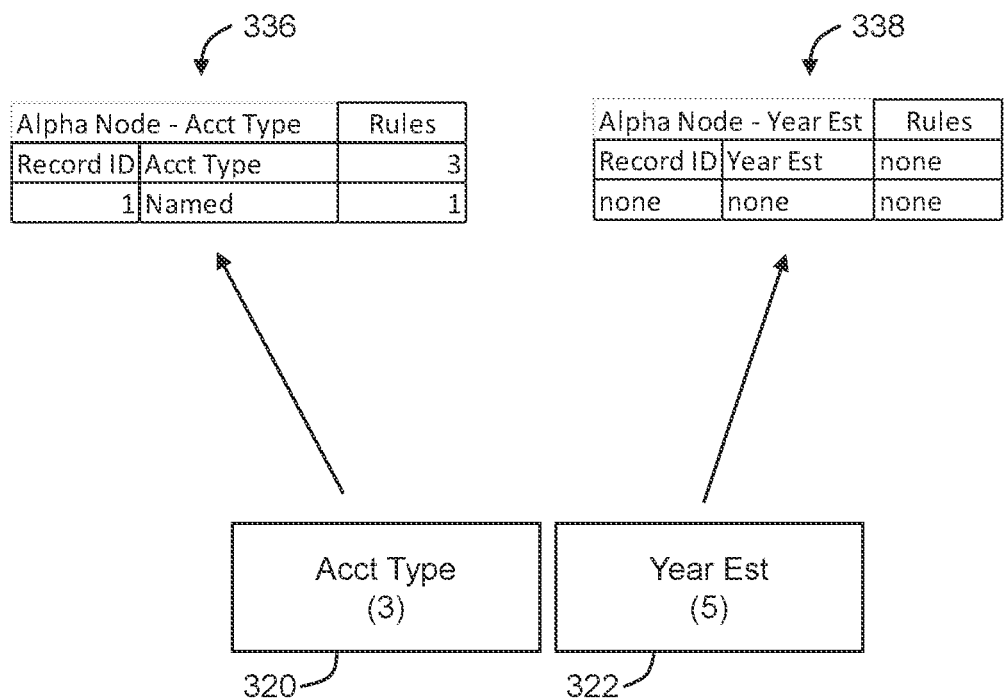

FIG. 3I illustrates WME 336, corresponding to the attribute "Acct Type" and WME 338, corresponding to the attribute "Year Est." WME 336 includes only a field corresponding to record number 1, since no other records are under evaluation, and since record 1 includes a value that matches the defined value of Rule 3. WME 338 has no record, since no record (only Record number 1 was still under evaluation) includes a value matching the defined value for "Year Est" in any rule. In one embodiment, an empty table is not generated, and instead no table is generated.

In one or more embodiments, a rule-processing engine or other device or interface that is requesting all data that satisfies a particular rule accesses the WME that is the terminal node for that rule. For example, if an interface requests all the records that satisfy Rule 2, a rule-processing engine accesses only WME 312 of FIG. 3G to identify all the records that have values for "Country" and "Industry" matching the values for any rule. The rule-processing engine or other interface may then identify, from the subset of records including values for "country" and "industry" attributes, which records satisfy Rule 2.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
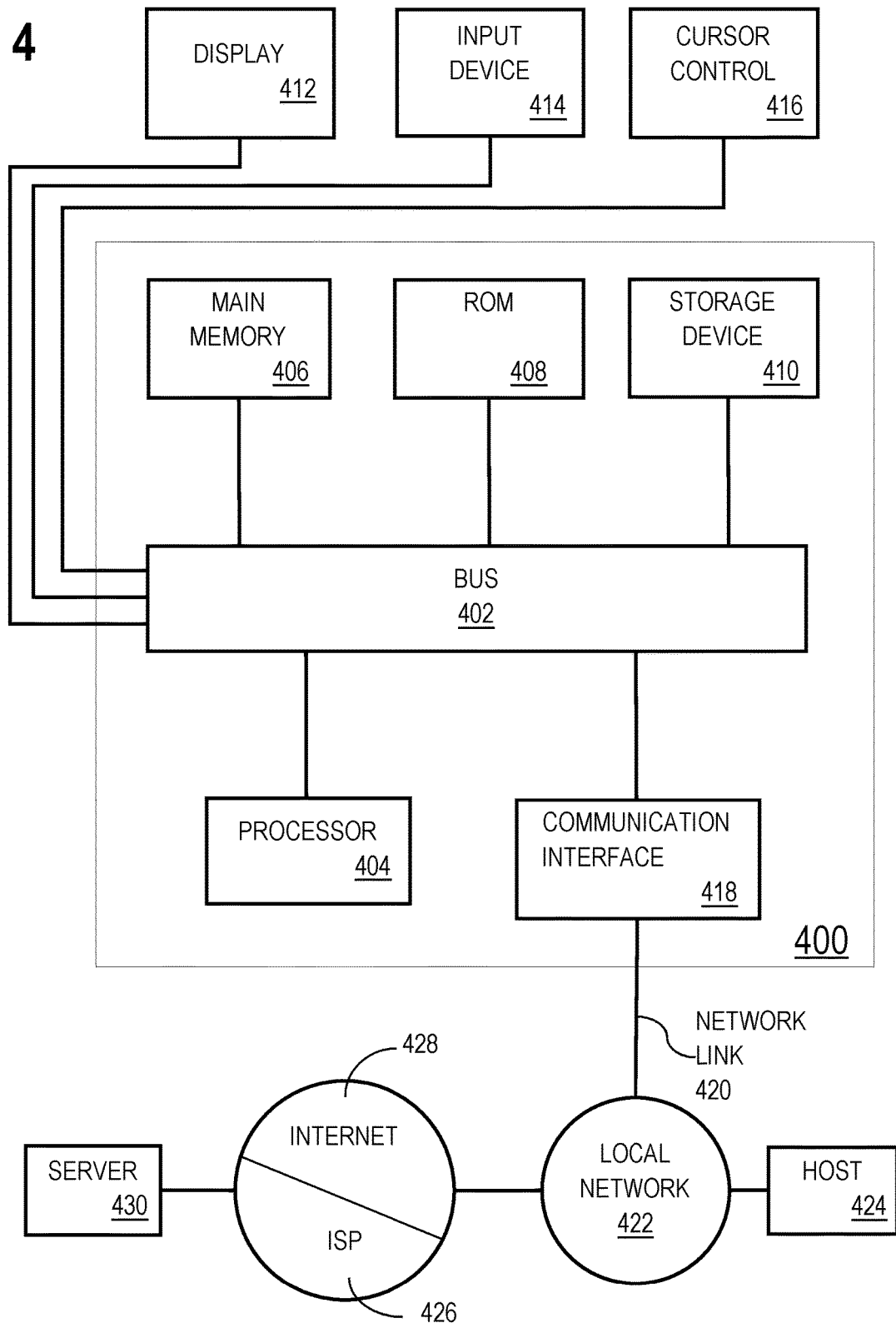
FIG. 4 shows a block diagram that illustrates a computer system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising:
    obtaining, by a rules-processing engine comprising one or more processors and memory, a plurality of rules, wherein each rule, of the plurality of rules, defines respective values for one or more attributes of a plurality of attributes;
    ranking, by the rules-processing engine, each particular attribute, of the plurality of attributes, based on a number of rules from the plurality of rules that define values for the particular attribute;
    generating a directed acyclic graph (DAG) tree for the plurality of attributes based on the rankings of the plurality of attributes, wherein each node of the DAG tree is associated with a corresponding attribute from the plurality of attributes;
    generating a first working memory element (WME) for a first node of the DAG tree that corresponds to a first attribute of the plurality of attributes, such that the first WME identifies each record, of a plurality of records in a data set, that comprises a record value for the first attribute that matches at least one of the values defined for the first attribute by at least one of the rules;
    retrieving, by the rules-processing engine, from a database, a first subset of records, of the plurality of records, identified by the first WME for application of a first rule of the plurality of rules.

2. The method of claim 1, further comprising:
    determining that the first node is a terminal node for the first rule of the plurality of rules at least by:
        determining that the first rule is associated with a first subset of attributes of the plurality of attributes based on the first rule defining values for each of the first subset of attributes;
        determining that each of the first subset of attributes, associated with the first rule, correspond to either (a) the first node or (b) a direct or indirect parent of the first node;
    wherein retrieving the first subset of records identified by the first WME for application of the first rule comprises:
        selecting the first WME based on (a) the first WME being associated with the first node and (b) the first node being the terminal node for the first rule;
        determining that each of the first subset of records are identified by the first WME.

3. The method of claim 2, further comprising:
    applying the first rule to the first subset of records to identify a second subset of records, from the first subset of records, comprising each attribute value defined by the first rule.

4. The method of claim 1, wherein generating the first WME comprises:
    generating a list of each record including the record value for the first attribute that matches at least one of the values defined for the first attribute by at least one of the rules, and including a record value for each additional attribute corresponding to each parent node in the DAG tree that matches at least one of the values defined for each additional attribute by at least one of the rule;
    generating a list of each attribute corresponding to a node downstream from the first node; and
    generating a list of each rule including a terminal node farther down the DAG tree than the first node.

5. The method of claim 1, further comprising:
    generating a second WME for a second node of the DAG tree that corresponds to a second attribute of the plurality of attributes, the second node being a child node to the first node, such that the second attribute has a ranking lower than the first attribute, and the second WME identifying a second subset of records;
    wherein identifying the second subset of records comprises:
        obtaining a list of the first subset of records identified by the first WME; and
        omitting from the second subset of records any record in the first subset of records that does not include a record value for the second attribute that matches at least one of the values defined for the second attribute by at least one of the rules.

6. The method of claim 1, further comprising:
    generating a second WME for a second node of the DAG tree that corresponds to a second attribute of the plurality of attributes, the second node being a child node to the first node, such that the second attribute has a ranking lower than the first attribute, and the second WME identifying a second subset of records;
    wherein the first WME identifies a relationship of the first subset of records with a first subset of rules;
    wherein the method comprises generating a second subset of rules, and the second WME identifies a relationship of the second subset of records with the second subset of rules;
    wherein generating the second subset of rules comprises:
        obtaining a list of the first subset of rules; and
        omitting from the second subset of rules any respective rule, in the first subset of rules, for which each attribute defined in the respective rule has an associated node of the DAG tree that is a parent node to the second node.

7. The method of claim 1, wherein each node of the DAG tree is associated with only one attribute, among the plurality of attributes.

8. The method of claim 1, further comprising generating a second DAG tree associated with a second data set; and
generating a beta node by combining the first node of the DAG tree with a second node of the second DAG tree,
wherein combining the first node and the second node comprises identifying each record in the data set and the second data set that comprises a record value for the first attribute that matches at least one of the values defined for the first attribute by at least one of the rules.

9. The method of claim 1, wherein the data set is stored in a database; and
the DAG tree is generated and stored in the database.

10. A method, comprising:
obtaining, by a rules-processing engine comprising one or more processors and memory, a plurality of rules, wherein each rule, of the plurality of rules, defines respective values for one or more attributes of a plurality of attributes;
ranking, by the rules-processing engine, each particular attribute, of the plurality of attributes, based on a number of rules from the plurality of rules that define values for the particular attribute;
generating a first directed acyclic graph (DAG) tree for the plurality of attributes based on the rankings of the plurality of attributes, wherein each node of the first DAG tree is associated with a corresponding attribute from the plurality of attributes;
generating a first working memory element (WME) for a first node of the first DAG tree that corresponds to a first attribute of the plurality of attributes, such that the first WME identifies each record, of a plurality of records in a data set, that comprises a record value for the first attribute that matches at least one of the values defined for the first attribute by at least one of the rules;
retrieving, by the rules-processing engine, from a database, a first subset of records, of the plurality of records, identified by the first WME for application of a first rule of the plurality of rules determining that the first node is a terminal node for the first rule of the plurality of rules at least by:
determining that the first rule is associated with a first subset of attributes of the plurality of attributes based on the first rule defining values for each of the first subset of attributes;
determining that each of the first subset of attributes, associated with the first rule, correspond to either (a) the first node or (b) a direct or indirect parent of the first node;
wherein retrieving the first subset of records identified by the first WME for application of the first rule comprises:
selecting the first WME based on (a) the first WME being associated with the first node and (b) the first node being the terminal node for the first rule;
determining that each of the first subset of records are identified by the first WME;
applying the first rule to the first subset of records to identify a second subset of records, from the first subset of records, comprising each attribute value defined by the first rule
wherein generating the first WME comprises:
generating a list of each record including the record value for the first attribute that matches at least one of the values defined for the first attribute by at least one of the rules, and including a record value for each additional attribute corresponding to each parent node in the first DAG tree that matches at least one of the values defined for each additional attribute by at least one of the rule;
generating a list of each attribute corresponding to a node downstream from the first node; and
generating a list of each rule including a terminal node farther down the first DAG tree than the first node;
generating a second WME for a second node of the first DAG tree that corresponds to a second attribute of the plurality of attributes, the second node being a child node to the first node, such that the second attribute has a ranking lower than the first attribute, and the second WME identifying a second subset of records;
wherein identifying the second subset of records comprises:
obtaining a list of the first subset of records identified by the first WME; and
omitting from the second subset of records any record in the first subset of records that does not include a record value for the second attribute that matches at least one of the values defined for the second attribute by at least one of the rules;
generating a third WME for a third node of the first DAG tree that corresponds to a third attribute of the plurality of attributes, the third node being a child node to the first node, such that the third attribute has a ranking lower than the first attribute, and the third WME identifying a third subset of records;
wherein the first WME identifies a relationship of the first subset of records to a first subset of rules;
wherein the method comprises generating a second subset of rules, and the third WME identifies a relationship between the third subset of records and the second subset of rules;
wherein generating the second subset of rules comprises:
obtaining a list of the first subset of rules; and
omitting from the second subset of rules any respective rule, in the first subset of rules, for which each attribute defined in the respective rule has an associated node of the first DAG tree that is a parent node to the second node;
wherein each node of the first DAG tree is associated with only one attribute, among the plurality of attributes;
generating a second DAG tree associated with a second data set; and
generating a beta node by combining the first node of the DAG tree with a fourth node of the second DAG tree,
wherein combining the first node and the fourth node comprises identifying each record in the data set and the second data set that comprises a record value for the first attribute that matches at least one of the values defined for the first attribute by at least one of the rules,
wherein the data set is stored in a database, and
wherein the DAG tree is generated and stored in the database.

11. One or more non-transitory machine-readable media storing instructions which, when executed by one or more processors, cause performance of operations comprising:
obtaining a plurality of rules, wherein each rule, of the plurality of rules, defines respective values for one or more attributes of a plurality of attributes;
ranking each particular attribute, of the plurality of attributes, based on a number of rules from the plurality of rules that define values for the particular attribute;

generating a directed acyclic graph (DAG) tree for the plurality of attributes based on the rankings of the plurality of attributes, wherein each node of the DAG tree is associated with a corresponding attribute from the plurality of attributes;

generating a first working memory element (WME) for a first node of the DAG tree that corresponds to a first attribute of the plurality of attributes, such that the first WME includes each record from a data set that comprises a record value for the first attribute that matches at least one of the values defined for the first attribute by at least one of the rules;

retrieving a first subset of records, of a plurality of records, identified by the first WME for application of a first rule of the plurality of rules.

12. The one or more non-transitory machine-readable media of claim 11, wherein the operations further comprise:
determining that the first node is a terminal node for the first rule of the plurality of rules at least by:
determining that the first rule is associated with a first subset of attributes of the plurality of attributes based on the first rule defining values for each of the first subset of attributes;
determining that each of the first subset of attributes, associated with the first rule, correspond to either (a) the first node or (b) a direct or indirect parent of the first node;
wherein retrieving the first subset of records identified by the first WME for application of the first rule comprises:
selecting the first WME based on (a) the first WME being associated with the first node and (b) the first node being the terminal node for the first rule;
determining that each of the first subset of records are identified by the first WME.

13. The one or more non-transitory machine-readable media of claim 12, wherein the operations further comprise:
applying the first rule to the first subset of records to identify a second subset of records, from the first subset of records, comprising each attribute value defined by the first rule.

14. The one or more non-transitory machine-readable media of claim 11, wherein generating the first WME comprises:
generating a list of each record including the record value for the first attribute that matches at least one of the values defined for the first attribute by at least one of the rules, and including a record value for each additional attribute corresponding to each parent node in the DAG tree that matches at least one of the values defined for each additional attribute by at least one of the rule;
generating a list of each attribute corresponding to a node downstream from the first node; and
generating a list of each rule under evaluation in the DAG tree.

15. The one or more non-transitory machine-readable media of claim 11, wherein the operations further comprise:
generating a second WME for a second node of the DAG tree that corresponds to a second attribute of the plurality of attributes, the second node being a child node to the first node, such that the second attribute has a ranking lower than the first attribute, and the second WME identifying a second subset of records;
wherein identifying the second subset of records comprises:
obtaining a list of the first subset of records identified by the first WME; and
omitting from the second subset of records any record in the first subset of records that does not include a record value for the second attribute that matches at least one of the values defined for the second attribute by at least one of the rules.

16. The one or more non-transitory machine-readable media of claim 11, wherein the operations further comprise:
generating a second WME for a second node of the DAG tree that corresponds to a second attribute of the plurality of attributes, the second node being a child node to the first node, such that the second attribute has a ranking lower than the first attribute, and the second WME identifying a second subset of records;
wherein the first WME identifies a relationship between the first subset of records and a first subset of rules;
wherein the second WME identifies a relationship between the second subset of records and a second subset of rules;
wherein generating the second subset of rules comprises:
obtaining a list of the first subset of rules; and
omitting from the second subset of rules any respective rule for which each attribute defined in the respective rule has an associated node of the DAG tree that is a parent node to the second node.

17. The one or more non-transitory machine-readable media of claim 11, wherein each node of the DAG tree is associated with only one attribute, among the plurality of attributes.

18. The one or more non-transitory machine-readable media of claim 11, wherein the operations further comprise:
generating a second DAG tree associated with a second data set; and
generating a beta node by combining the first node of the DAG tree with a second node of the second DAG tree, wherein combining the first node and the second node comprises identifying each record in the data set and the second data set that comprises a record value for the first attribute that matches at least one of the values defined for the first attribute by at least one of the rules.

19. A system, comprising:
one or more processors; and
memory storing instructions that, when executed by the one or more processors, cause the system to:
obtain a plurality of rules, wherein each rule, of the plurality of rules, defines respective values for one or more attributes of a plurality of attributes;
rank each particular attribute, of the plurality of attributes, based on a number of rules from the plurality of rules that define values for the particular attribute;
generate a directed acyclic graph (DAG) tree for the plurality of attributes based on the rankings of the plurality of attributes, wherein each node of the DAG tree is associated with a corresponding attribute from the plurality of attributes;
generate a first working memory element (WME) for a first node of the DAG tree that corresponds to a first attribute of the plurality of attributes, such that the first WME includes each record from a data set that comprises a record value for the first attribute that matches at least one of the values defined for the first attribute by at least one of the rules;
retrieve a first subset of records, of a plurality of records, identified by the first WME for application of a first rule of the plurality of rules.

20. The system of claim 19, wherein the instructions further cause:

determining that the first node is a terminal node for the first rule of the plurality of rules at least by:
determining that the first rule is associated with a first subset of attributes of the plurality of attributes based on the first rule defining values for each of the first subset of attributes;
determining that each of the first subset of attributes, associated with the first rule, correspond to either (a) the first node or (b) a direct or indirect parent of the first node;
wherein retrieving the first subset of records identified by the first WME for application of the first rule comprises:
selecting the first WME based on (a) the first WME being associated with the first node and (b) the first node being the terminal node for the first rule;
determining that each of the first subset of records are identified by the first WME.

21. The system of claim 20, wherein the instructions further cause:
applying the first rule to the first subset of records to identify a second subset of records, from the first subset of records, comprising each attribute value defined by the first rule.

22. The system of claim 19, wherein generating the first WME comprises:
generating a list of each record including the record value for the first attribute that matches at least one of the values defined for the first attribute by at least one of the rules, and including a record value for each additional attribute corresponding to each parent node in the DAG tree that matches at least one of the values defined for each additional attribute by at least one of the rule;
generating a list of each attribute corresponding to a node downstream from the first node; and
generating a list of each rule under evaluation in the DAG tree.

23. The system of claim 19, wherein the instructions further cause:
generating a second WME for a second node of the DAG tree that corresponds to a second attribute of the plurality of attributes, the second node being a child node to the first node, such that the second attribute has a ranking lower than the first attribute, and the second WME identifying a second subset of records;
wherein identifying the second subset of records comprises:
obtaining a list of the first subset of records identified by the first WME; and
omitting from the second subset of records any records in the first subset of records that do not include a record value for the second attribute that matches at least one of the values defined for the second attribute by at least one of the rules.

24. The system of claim 19, wherein the instructions further cause:
generating a second WME for a second node of the DAG tree that corresponds to a second attribute of the plurality of attributes, the second node being a child node to the first node, such that the second attribute has a ranking lower than the first attribute, and the second WME identifying a second subset of records;
wherein the first WME identifies a relationship between the first subset of records and a first subset of rules;
wherein the second WME identifies a relationship between the second subset of records and a second subset of rules;
wherein the instructions cause: generating a second subset of rules, and the second WME identifies a relationship between the second subset of records and the second subset of rules;
wherein generating the second subset of rules comprises:
obtaining a list of the first subset of rules; and
omitting from the second subset of rules any respective rule, in the first subset of rules, for which each attribute defined in the respective rule has an associated node of the DAG tree that is a parent node to the second node.

25. The system of claim 19, wherein each node of the DAG tree is associated with only one attribute, among the plurality of attributes.

* * * * *

UNITED STATES PATENT AND TRADEMARK OFFICE
CERTIFICATE OF CORRECTION

| | | |
|---|---|---|
| PATENT NO. | : 11,537,611 B2 | Page 1 of 1 |
| APPLICATION NO. | : 17/130099 | |
| DATED | : December 27, 2022 | |
| INVENTOR(S) | : Ajanahalli et al. | |

It is certified that error appears in the above-identified patent and that said Letters Patent is hereby corrected as shown below:

In the Specification

In Column 4, Line 28, delete "un-resolved" and insert -- unresolved --, therefor.

Signed and Sealed this
Seventeenth Day of October, 2023

Katherine Kelly Vidal
*Director of the United States Patent and Trademark Office*